A. M. FARNHAM.
Heating Ovens by Steam.

No. 197,462. Patented Nov. 27, 1877.

Attest,
W. C. Coyliss
L. A. Bunting

Inventor,
Asa M. Farnham.
By Cobrin & Thacher
Attys.

UNITED STATES PATENT OFFICE.

ASA M. FARNHAM, OF CHICAGO, ILLINOIS, ASSIGNOR OF ONE-HALF HIS RIGHT TO PARKER H. HALE, OF SAME PLACE; AND SAID FARNHAM AND HALE ASSIGNORS OF ONE-THIRD OF THEIR RIGHT TO LEOPOLD BUXBAUM, OF SAME PLACE.

IMPROVEMENT IN HEATING OVENS BY STEAM.

Specification forming part of Letters Patent No. 197,462, dated November 27, 1877; application filed April 13, 1877.

*To all whom it may concern:*

Be it known that I, ASA M. FARNHAM, of Chicago, in the county of Cook and State of Illinois, have invented a new and useful Improvement in Heating Ovens by Steam, which is fully set forth in the following specification, reference being had to the accompanying drawings, in which—

Figure 1:
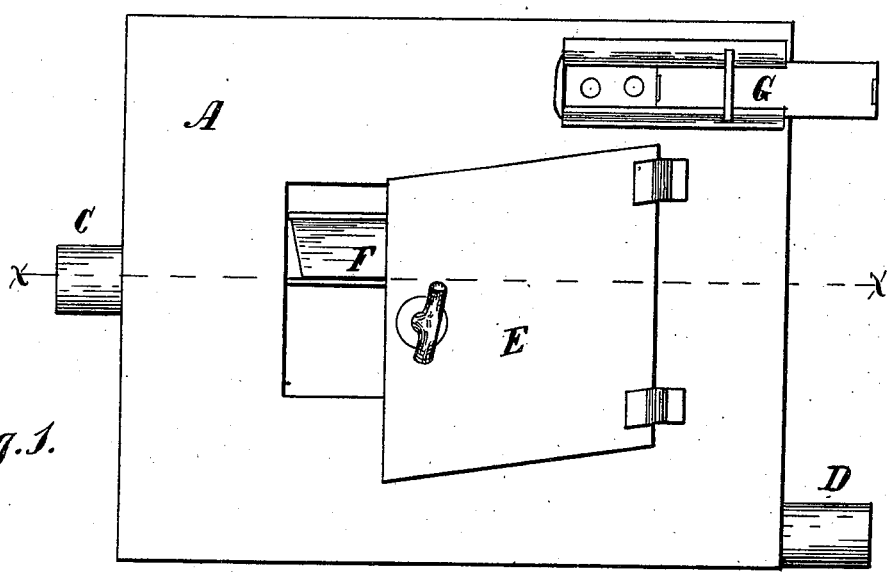
Figure 2:
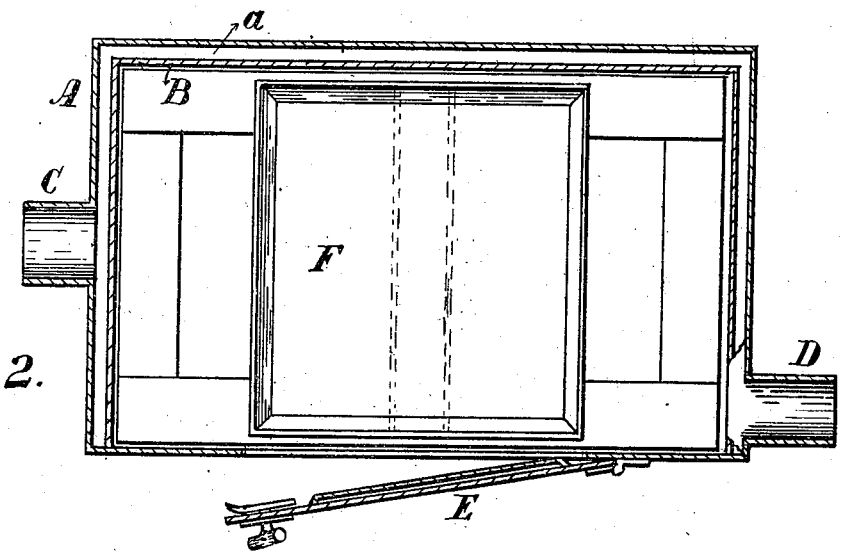
Figure 3:
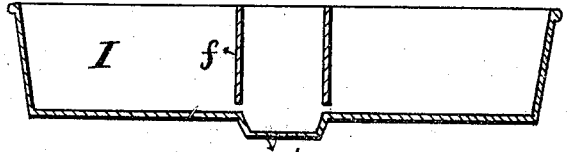

Figure 1 represents a front elevation of my oven, with the door partly open; Fig. 2, a plan view, in section, on the line *x x*, Fig. 1; Fig. 3, a sectional view of a bake-pan on an enlarged scale.

My invention relates to an apparatus for roasting meats, in which the heating is accomplished by steam without coming in contact with the meat.

The invention consists in baking articles of food in an oven, surrounded by a jacket, so as to form a free space all around, through which a current of live steam is caused to pass, whereby the temperature of the oven may be raised to any desired degree, and may be controlled as to temperature by regulating the quantity and pressure of the steam admitted.

I am aware that various operations analogous to cooking have been conducted by means of chambers heated by means of steam; but, so far as I know, in all such cases, there has not been any active circulation and passage of steam through the jacketed space surrounding said chamber, but only steam has been admitted and the water of condensation permitted to escape.

It is evident, if the inclosed chamber acts as a condenser, two results must follow: first, the temperature at the walls of said chamber cannot exceed 212°; second, the temperature must greatly vary between the points at which steam is admitted and water suffered to escape. These consequences would be fatal to an oven designed for cooking upon a large scale, as mine is. Both of said objectionable results are avoided by my present invention. The jacket-space, being filled always with live steam, may be raised to any temperature desired, and all parts will be at the temperature of said steam— *i. e.*, the temperature will be practically uniform at all parts.

Hot air parts with its heat much more rapidly than steam does, and it is therefore much more difficult to control the heat of a large oven by means of hot air so as to maintain a temperature practically uniform at all points; yet such control is requisite where food is cooked on a large scale for commercial purposes. With live steam surrounding the cooking-chamber such control is easy.

In the drawings, B represents an oven of any desirable form, which is inclosed by a metallic jacket, A, the latter being arranged at a little distance from the oven, so as to leave a free space, *a*, on all sides of the latter except the front, between it and the jacket. An inlet-pipe, C, is inserted in the jacket at some convenient point, by means of which steam may be introduced within the former. An outlet or drip pipe, D, is also inserted in the jacket on the side of the apparatus opposite to the inlet-pipe, and at the bottom of the oven, for the escape of steam, so that all drip arising from the condensation of the steam against the inner surface of the jacket may be carried off. The steam fills and circulates through the passage *a* all around the oven, and escapes through the pipe D, or may be retained within the jacket to any extent desired.

By this means the oven A is readily heated to any degree required, and the temperature within can be regulated with the utmost certainty by regulating the flow of steam.

In the front of the oven is a door, E, through which admission is gained into the interior, which is fitted with suitable supports for bake-pans F. A ventilator, G, is also provided at one of the upper corners of the oven, which, when opened, allows the escape of vapors from the interior of the oven, with which the ventilator communicates, and not with the free space between the jacket and the oven.

This oven is especially designed for use in packing establishments, where it is necessary to cook large quantities of meat at once. The oven is then made of large size, and the door in front extends entirely across, so that bake-bans as long as the oven may be introduced, the pans I, constructed with two partitions, $f$, running across from side to side a short distance from each other, as shown in Fig. 3 of the drawings. These partitions do not extend quite to the bottom of the pan, and just below them there is a depression, $f'$, in the bottom of the latter, into which the juices of the meat flow from the sides, and from which they may be dipped and poured over the meat while cooking.

The oven may be constructed so that the steam-space will also surround a portion of the front side, the doorway into the oven being constructed so that all communication with the steam-space will be prevented.

In roasting meats—beef, for instance—in the usual way, the fibrine and albumen, instead of being carefully retained in a soft soluble condition, easy of digestion, are almost invariably hardened into a tough, horny, indigestible mass, unfitted for nutritious purposes. The volatile phosphates are disorganized by the excessive and irregular application of the heat, and the richest materials of nerve-supply lost, the combination being destroyed, and the elements assuming a gaseous state, whenever heated to about 180° Fahrenheit.

My improved oven is intended to remedy these defects, by applying the steam in such a manner as to be perfectly under control. The oven being properly heated and the meat introduced, whenever the surface of the latter is hardened sufficiently to hold and retain the juices, which can be readily determined by direct examination, the heat can be lowered immediately to the proper degree of temperature to continue and complete the roasting without destroying or injuring the most nutritious element of the meat.

Having thus described my invention, what I claim as new, and desire to secure by Letters Patent, is—

The process of baking articles of food by means of heat transmitted through the walls of the oven from a current of live steam circulating around the oven, substantially as and for the purpose set forth.

ASA M. FARNHAM.

Witnesses:
M. M. DILLON,
W. C. CORLIES.